July 4, 1944.     L. O. CARLSEN     2,352,689
GEAR CUTTING MACHINE
Filed Oct. 18, 1939     13 Sheets-Sheet 1

INVENTOR
LEONARD O. CARLSEN
BY
ATTORNEY

July 4, 1944.　　　L. O. CARLSEN　　　2,352,689
GEAR CUTTING MACHINE
Filed Oct. 18, 1939　　　13 Sheets-Sheet 2

INVENTOR
LEONARD O. CARLSEN
BY
ATTORNEY

July 4, 1944.  L. O. CARLSEN  2,352,689
GEAR CUTTING MACHINE
Filed Oct. 18, 1939  13 Sheets-Sheet 3

INVENTOR
LEONARD O. CARLSEN
BY
ATTORNEY

July 4, 1944. L. O. CARLSEN 2,352,689
GEAR CUTTING MACHINE
Filed Oct. 18, 1939 13 Sheets-Sheet 5

Inventor
LEONARD O. CARLSEN
By
B. F. Schlesinger
Attorney

INVENTOR
LEONARD O. CARLSEN
ATTORNEY

July 4, 1944.  L. O. CARLSEN  2,352,689
GEAR CUTTING MACHINE
Filed Oct. 18, 1939  13 Sheets-Sheet 7

Inventor
LENOARD O. CARLSEN
By
Attorney

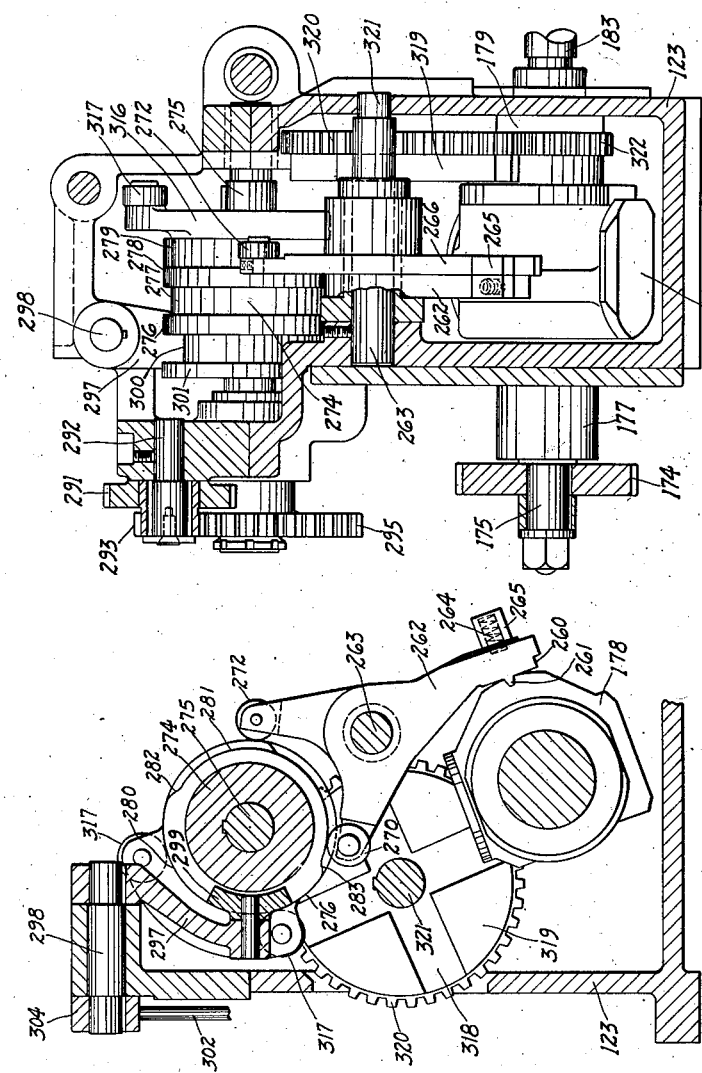

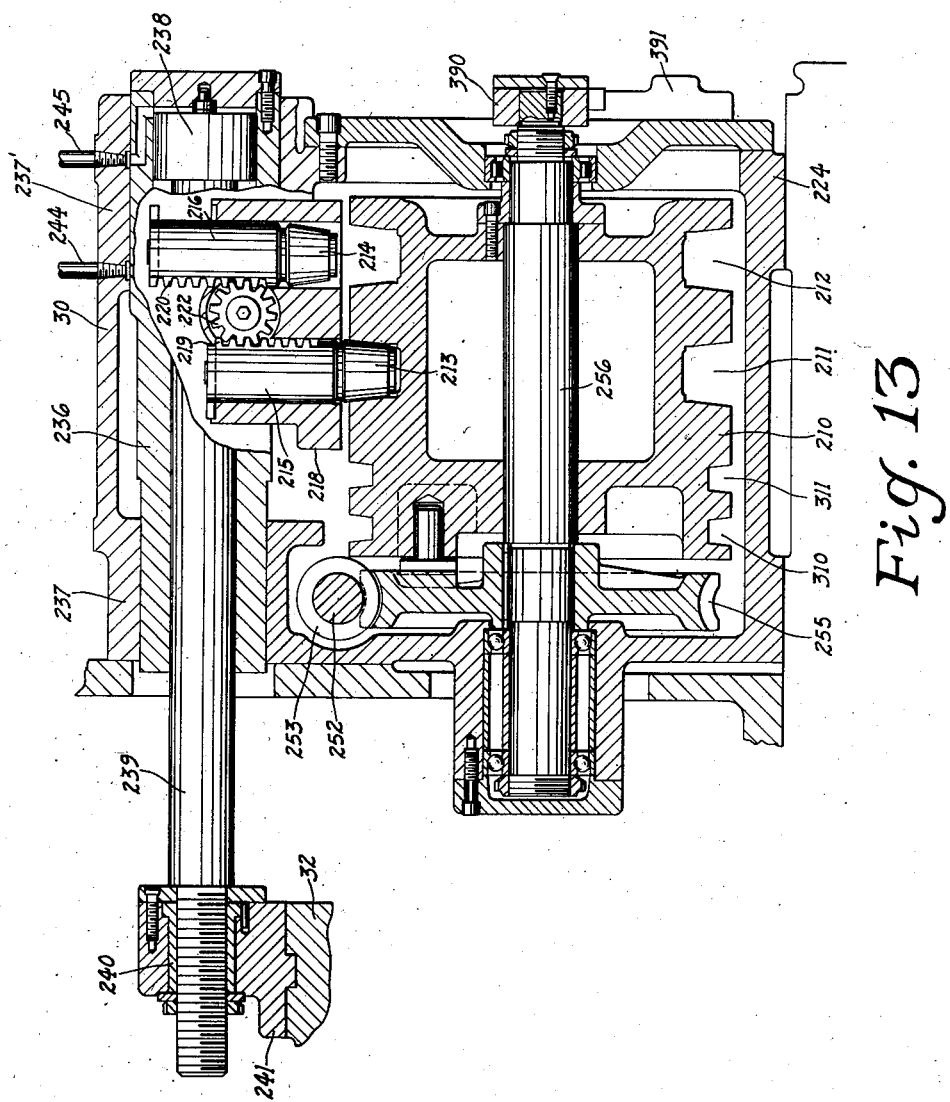

July 4, 1944. L. O. CARLSEN 2,352,689
GEAR CUTTING MACHINE
Filed Oct. 18, 1939 13 Sheets-Sheet 11

INVENTOR
LEONARD O. CARLSEN
BY
ATTORNEY

July 4, 1944.　　　L. O. CARLSEN　　　2,352,689
GEAR CUTTING MACHINE
Filed Oct. 18, 1939　　　13 Sheets-Sheet 12

INVENTOR
LEONARD O. CARLSEN
BY
ATTORNEY

July 4, 1944.   L. O. CARLSEN   2,352,689
GEAR CUTTING MACHINE
Filed Oct. 18, 1939   13 Sheets-Sheet 13

Inventor
LEONARD O. CARLSEN
By
Attorney

Patented July 4, 1944

2,352,689

UNITED STATES PATENT OFFICE 2,352,689

GEAR-CUTTING MACHINE

Leonard O. Carlsen, Rochester, N. Y., assignor to Gleason Works, Rochester, N. Y., a corporation of New York Application October 18, 1939, Serial No. 300,025

17 Claims. (Cl. 90—6)

The present invention relates to machines for producing gears and particularly to machines of the "geared-roll" intermittent-indexing type for generating tapered gears. In a more specific aspect, the invention relates to two-tool machines for finish-cutting straight bevel gears.

One purpose of the present invention is to provide a two-tool straight bevel gear generator for general purpose work which will be easier to set up and which will be faster and more accurate in operation than any such generators heretofore built.

To this end, one object of the invention is to provide an improved tool-actuating mechanism which will more surely hold the tools against possible deflection during their cutting strokes.

A further object of the invention is to provide a machine of the geared-roll type in which the various mechanisms for controlling the machine operations are so arranged that they may readily be assembled and timed while on a bench, thereby simplifying the construction and timing of the machine.

Another object of the invention is to provide a machine of the type described in which the various mechanisms for controlling the machine operations are arranged at one end of the machine so that the operator can adjust them from a single position.

Another object of the invention is to provide in a machine of the geared-roll type an improved indexing mechanism which may be operated at high speed without shock or vibration.

Another object of the invention is to provide in a machine of the character described, mechanism for moving the work rapidly to and from loading position for removal of a completed gear or chucking of a new gear blank.

A further object of the invention is to provide for a machine of the character described, an improved stock-dividing gauge which will be simple in construction and universal in range.

Still another object of the invention is to provide a method for and a machine capable of cutting straight bevel gears with longitudinally crowned teeth so that mating gears may be produced that mesh with localized tooth bearing or contact and that are capable of adjustment in use.

Other objects of the invention will be apparent hereinafter from the specification and from the recital of the appended claims.

In the drawings:

Fig. 11 is a view looking at one end of the index mechanism;

Fig. 12 is a view taken at right angles to Fig. 11 and looking at the index mechanism from one side;

Fig. 13 is a fragmentary sectional view showing the feed cam and the mechanism connecting this cam with the sliding base;

Figures 22, 23:
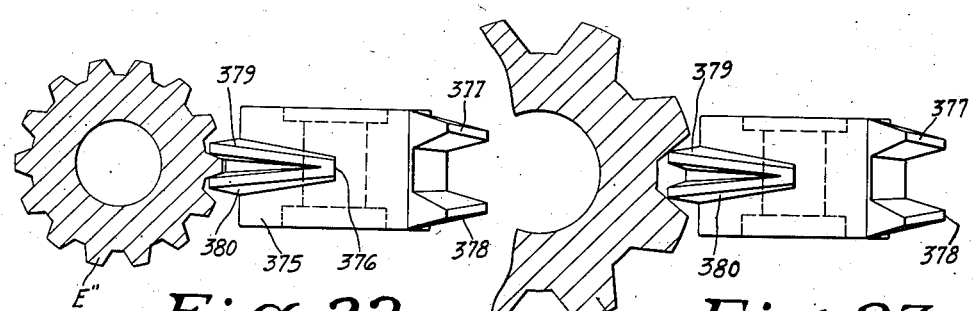
Fig. 22 is a diagrammatic view illustrating a stock dividing device made according to a still further modification of this invention in use for positioning a fine pitch gear having an even number of teeth.
Fig. 23 is a corresponding view illustrating the use of the same device for positioning a coarse pitch gear having an odd number of teeth.
Figure 24:
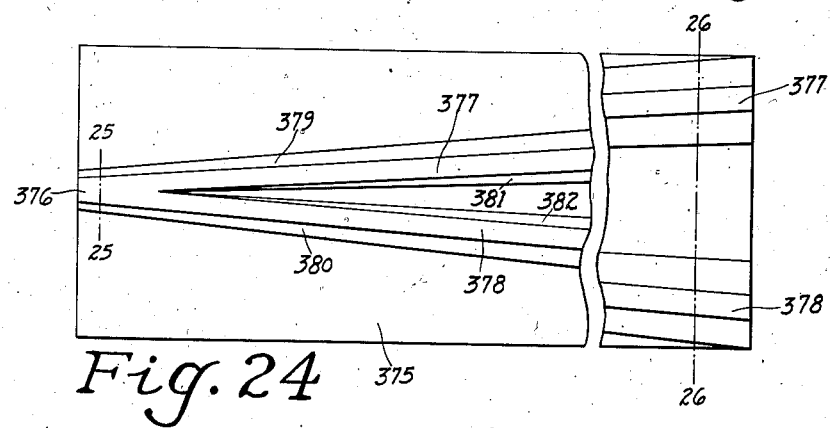
Figures 25, 26:
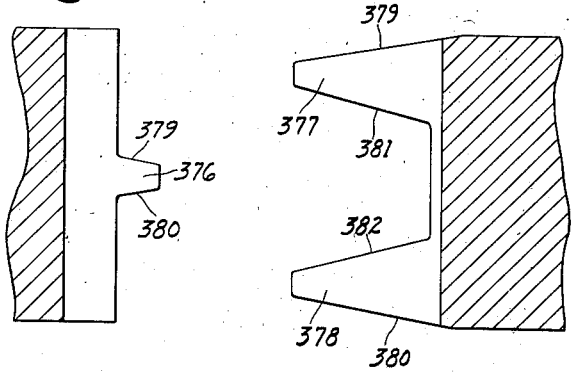

Fig. 24 is a developed view of the stock dividing device shown in Figs. 22 and 23; and Figs. 25 and 26 are fragmentary sectional views on the lines 25—25 and 26—26 of Fig. 24, respectively.

In general the machine illustrated in the drawings is an improvement over the two tool straight bevel gear generator of U. S. Patent 1,656,633 of January 17, 1928. Like the machine of that patent it has a pair of planing tools which are reciprocated simultaneously in opposite directions to cut alternately on opposite sides of a tooth of a gear blank. The tools are mounted on an oscillatory cradle which is driven in time with the rotation of the work spindle to effect the generating roll of the machine. The tools may cut during roll in one direction only or during roll in both directions. For generating a gear, the blank is fed into operative relation with the tools, then blank and tools are rolled together to generate a tooth of the gear, then the blank is withdrawn from operative position and indexed. Then the blank is fed back into the tools and the cycle begins anew. When all of the teeth have been cut, the blank may be withdrawn to loading position to permit taking the completed gear off of the machine and chucking of a new gear blank.

In the machine illustrated, each of the tools cuts on movement in one direction only and is withdrawn from cutting position on its return stroke. Each tool is secured to a slide which reciprocates in a ram that, in turn, is mounted in a tool carrier for reciprocation in a direction perpendicular to the direction of reciprocation of the slide. The two tool carriers are mounted on the cradle for angular adjustment thereon to determine the paths of movement of the tools. The slides are actuated by a crank to impart the cutting and return movements to the tools and the rams are actuated by a cam to move the tools to and from cutting position at opposite ends of the strokes of the slides. The crank and cam are mounted upon the same shaft.

The tool reciprocating and relieving mechanisms of the present machine are similar to those of my prior Patent No. 2,101,237, but in the present machine, the cam operates each ram through a pivotally mounted lever that carries a roller at one end which engages the cam, and a roller at its opposite end which engages the ram. Through the levers, power is applied to each ram at a point directly in line with the point of cut of the tool carried by the slide which is mounted upon the ram. Hence each tool is held surely against deflection while it is cutting.

Ordinarily in the cutting of a bevel gear, the tip of the tool travels in a plane tangent to the root cone of the gear. It is contemplated employing cams on the present machine, however, that will vary the depth at which a tool cuts as the tool moves across the face of a gear blank. With the present machine, then, it is possible to move the tip of the tool in a curved path as it crosses the face of the blank with the result that tooth surfaces may be cut upon the gear which are longitudinally convex or crowned. A gear cut in this fashion will mesh with its mate with a localized tooth bearing or contact and hence, unlike an ordinary bevel gear, will be insensitive to variations in mountings or loads.

The cradle and the work spindle are driven in timed relation, for generating the tooth profiles of a gear, by a train of gearing which includes change gears governing the rate and ratio of the rolling movement and the number of teeth to be cut in the blank. The several gear trains are arranged in the present machine so that all of the change gears are located at one end of the machine where they are readily accessible to the operator.

As in the machine of prior Patent No. 1,656,633, the work spindle is journaled in a head that is mounted on a sliding base which is reciprocable in the direction of the axis of the cradle to move the work to and from operative position. As in the prior patent mentioned, the movement of the sliding base is controlled by a rotary feed cam that has two tracks, one of which is used during the rough-cutting of a gear and the other during finish-cutting. The machine of the present invention differs, however, from the machine of the prior patent in that the feed cam is located at the same end of the machine as the change gears so that the operator can readily make the change over from rough-cutting to finish-cutting or vice versa without going around the machine. By putting the feed cam at the tool end of the machine, moreover, all control parts are kept clear of the cutting coolant and of chips. Further, lubrication of the parts is facilitated.

In the present machine, the feed cam is operatively connected with the sliding base by a lever which is secured to a cylinder that houses a reciprocable piston which is fastened to the sliding base. When the sliding base is in operating position, the piston bottoms in one end of the cylinder and is held in that position by fluid-pressure. The motion of the feed cam, then, is transmitted directly from cylinder to piston and thence to the sliding base. To move the sliding base to loading position, pressure fluid is admitted to the cylinder to move the piston in the cylinder and thereby move the sliding base relative to the feed cam and lever. By reversing the direction of flow of the pressure fluid the sliding base can be returned again to operative position. A hand valve is provided to control the movement of the piston in the cylinder. This valve is located at the same end of the machine as the change gears.

As in the machine of prior Patent No. 1,656,633, the work spindle is driven through a differential, one member of which is locked against rotation during cutting. To index the work, this member is periodically released and actuated. In order to operate the present machine at the higher speeds desired, a new and improved type of index mechanism has been provided for controlling the locking and unlocking of the differential member and the rotation of this member when released. The index mechanism includes a Geneva wheel which is geared to the housing of the differential, a lock-up dog which holds the housing against rotation during cutting of the tooth of the gear blank, an axially reciprocable cam, a pin that is adapted to engage the Geneva wheel and which is secured to the cam, and means for moving said cam periodically axially so that the cam will be moved periodically into operative relation with the locking dog, to trip the locking dog out of locking position, and the pin will be moved periodically into operative relation with the Geneva wheel, to rotate the wheel through an angle sufficient to effect indexing. The Geneva mechanism insures a slow start and stop motion for indexing, permitting indexing to be effected at high speed.

The index mechanism and the feed-cam and cooperating parts are mounted in a removable bracket so that they may be assembled on the bench. This makes it easier to time the machine and materially expedites construction of the machine or repair thereof.

A further improvement of the present machine is in the stock-dividing device. The stock-dividing device is provided, as is customary, to enable a previously roughed gear blank to be positioned on the machine in proper relation to the two reciprocating tools so that proper amounts of stock may be removed from opposite sides of the teeth of the blank in the finish cutting operation.

Three different embodiments of the improved stock-dividing mechanism are illustrated in the accompanying drawings. In one embodiment, a gauge is provided for dividing stock of gears having odd numbers of teeth. In another embodiment, a gauge is provided for dividing stock of gears having even numbers of teeth. In a third embodiment a gauge is provided which is universal in use and which may be employed for dividing stock of gears having either odd or even numbers of teeth.

The gauge for gears with odd numbers of teeth is in the form of a rotatably adjustable member that has a peripheral tooth-like projection whose sides are of straight profile but lie in helices of opposite hands so that they diverge from one another around the periphery of the gauge. The gauge is so mounted upon the machine that the median line through the tooth-like projection lies in the horizontal center line of the machine. Hence, when the tooth-like projection is engaged in a tooth space of a gear having an odd number of teeth, the median line of that tooth of the gear, which is diametrically opposite the tooth space, will also lie in the horizontal center line of the machine and be disposed centrally between the two cutting tools. By rotatably adjusting the gauge on its axis, different parts of the tooth-like projection can be brought into operative position to locate gear blanks of different pitch. Thus the same gauge may be used for positioning any gear blank having an odd number of teeth whose pitch is within the cutting range of the machine.

The gauge for even numbers of teeth is similar to the gauge already described except that it is of female form. It has two cooperating toothlike projections whose adjacent side surfaces are helical surfaces of opposite hand so that they form a tooth space whose sides diverge from one another around the periphery of the gauge. The projections are adapted to straddle a tooth of the gear blank to center the diametrically opposite tooth of the blank between the two cutting tools. By rotatably adjusting the gauge it may be used to locate gears of different pitch.

The universal type gauge has two tooth-like helical projections which at one end merge together. Each projection has diverging opposite side surfaces and the hands of the two projections are opposite. The two projections may be engaged either in a tooth space of a roughed gear blank, for locating a gear blank having an odd number of teeth, or they may straddle a tooth of a gear blank, for locating a blank that has an even number of teeth. The third type gauge may be used, then, to position any gear blank within the cutting range of the machine.

Reference will now be had to the drawings for a more detailed description of the invention. 30 denotes the base or frame of the machine. On the base are mounted the cradle 31 (Figs. 4 and 5), which carries the cutting tools, and the sliding base 32 (Figs. 1 and 2), which carries the work spindle.

Figure 2:
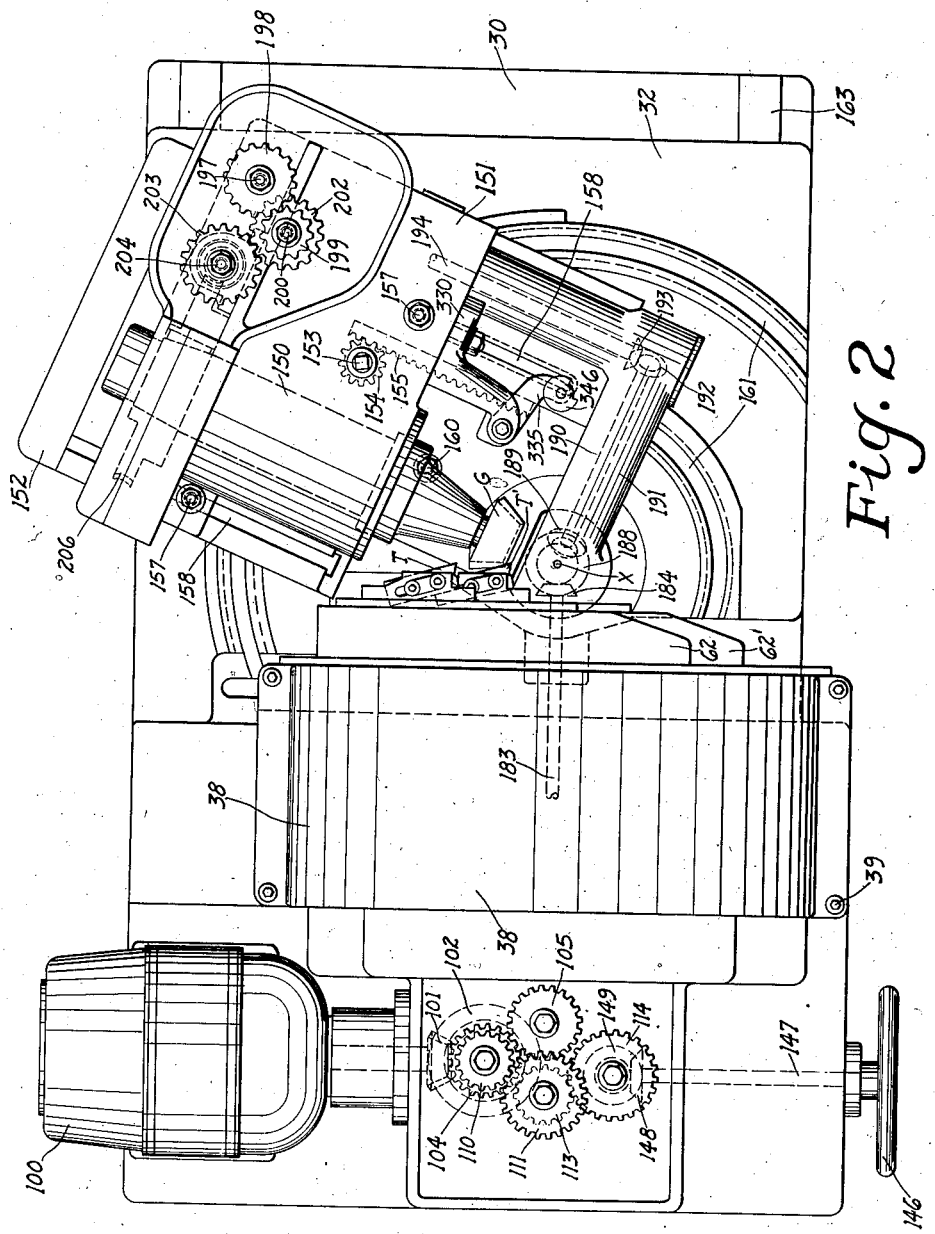
Fig. 2 is plan view of this machine.
Figure 4:
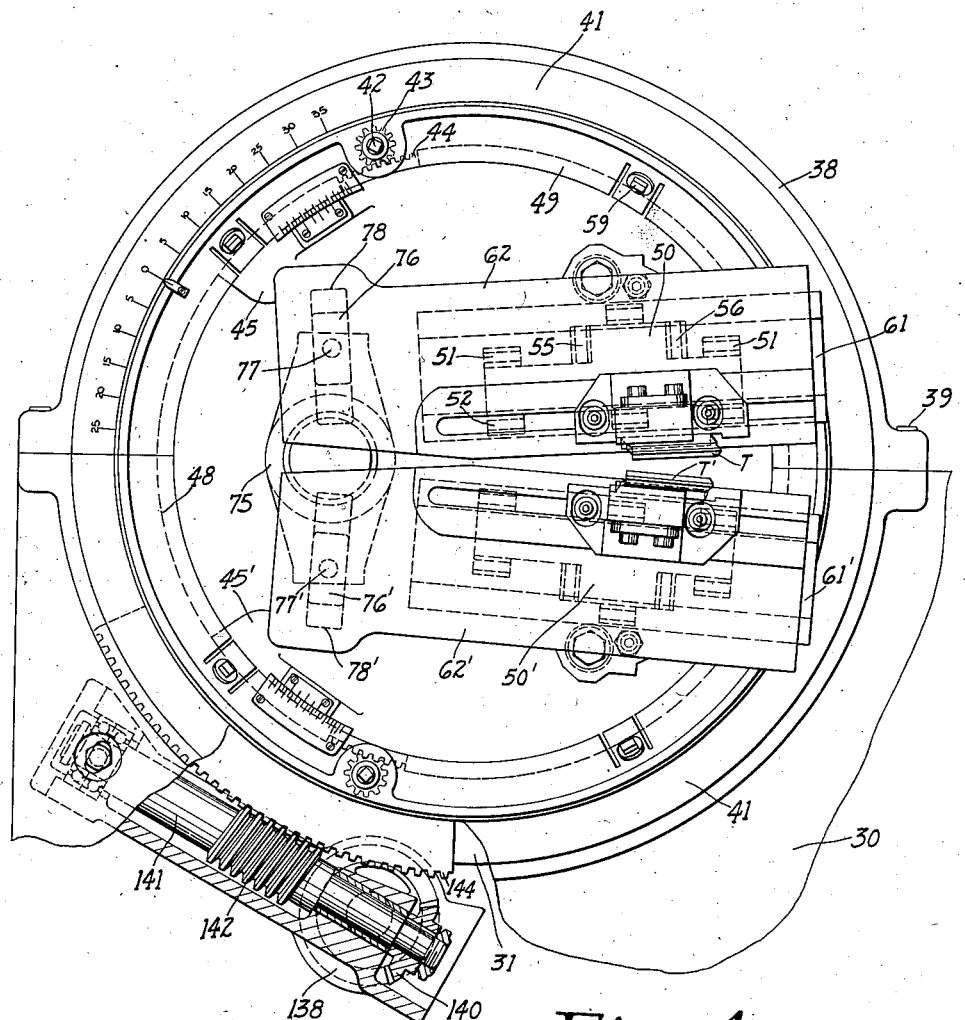
Fig. 4 is an elevational view looking at the front end of the tool carrying cradle.
Figure 5:
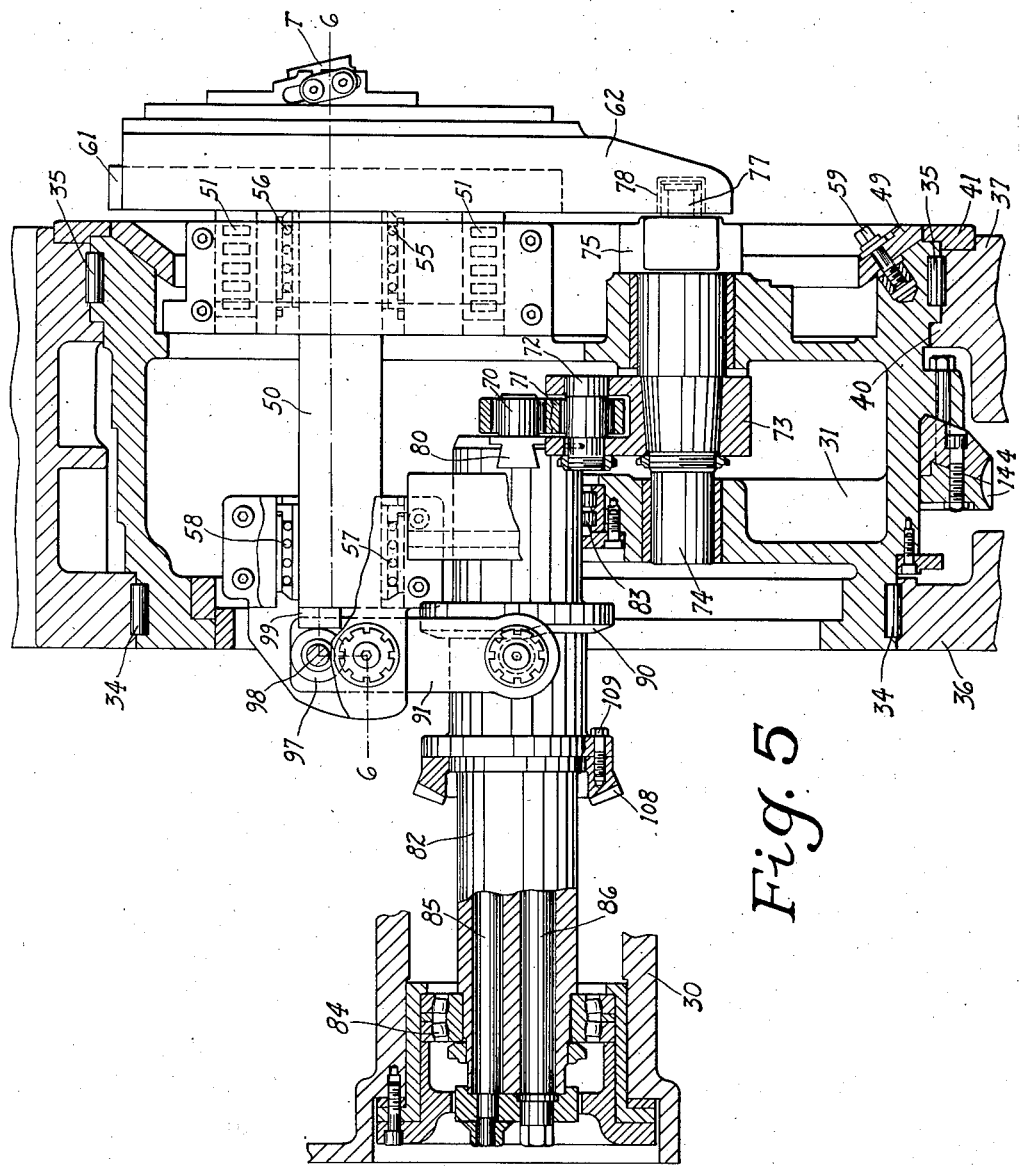
Fig. 5 is a transverse sectional view through the cradle.

The cradle is a full circular cradle and is journaled by means of roller bearings 34 and 35 on spaced semi-circular ways 36 and 37 formed on the base 30 (Fig. 5). It is held in position by the semi-circular cap member 38 which is secured to the base by screws 39 (Figs. 2 and 4). The cradle is held against axial movement in the base and cover plate by a flange or shoulder 40 formed on the base and by the semi-circular retaining plate or gib 41 which is bolted to the column and to the cap member 38.

Figure 6:
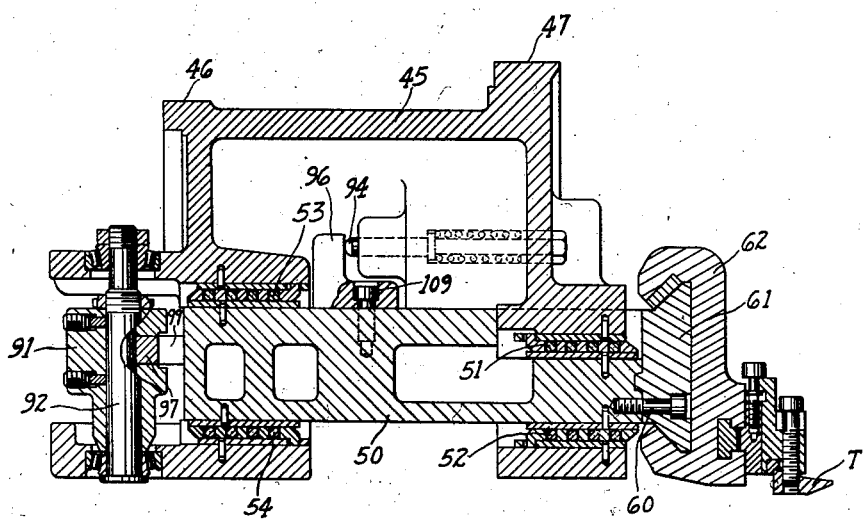
Fig. 6 is a fragmentary sectional view through the cradle taken on the line 6—6 of Fig. 5 and showing the upper tool carrying slide and ram.

Mounted in the cradle 31 for angular adjustment therein are a pair of angularly adjustable tool carriers 45 and 45' (Figs. 4 and 6). The adjustment of each tool carrier determines the path of movement of the cutting tool mounted thereon. For cutting straight bevel gears, the tool carriers are adjusted so that the two tools will move in paths inclined to one another at an angle equal to the angle between opposite sides of a tooth of the gear to be cut. Adjustment of each carrier is effected by rotation of a shaft 42 (Fig. 4) that is journaled in the cradle and that carries a spur pinion 43 which meshes with a spur gear segment 44 that is secured to the carrier. The carriers are secured in adjusted positions by a gib 49 that is secured to the cradle by bolts 59. Suitable graduations are provided on the gib and carriers to permit the adjustments to be made accurately.

Each of these tool carriers is formed with spaced arcuate guides or bearing surfaces 46 and 47 that are adapted to seat on cylindrical ways formed internally in the cradle. One of these ways is shown in dotted lines at 48 in Fig. 4. The construction is substantially the same as shown in my prior Patent No. 2,101,237 and need not further be described here.

The carrier 45 carries the upper tool slide and ram and the carrier 45' carries the lower tool slide and ram. The two tool carriers and the parts mounted thereon are identical in construction save for the reversal of parts necessary to the different positions of the two tools and accordingly in the following description only the upper carrier will be described in detail. Corresponding parts of the other carrier will be denoted by corresponding reference numerals primed.

Mounted to reciprocate upon the carrier 45 in a direction parallel to the axis of the cradle 31 is a ram 50 (Figs. 4, 5 and 6). The ram is mounted to slide upon laterally spaced sets of upper and lower roller bearings 51 and 52 at its forward end and upon upper and lower roller bearings 53 and 54 at its rear end, and it is guided in its movement by spaced roller bearings 55 and 56 at its forward end and 57 and 58 at its rear end.

Secured to the front end of the ram 50 by means of screws 60 is a dove-tailed guide 61 which extends in a direction at right angles to the direction of movement of the ram. The upper tool slide 62 is mounted to reciprocate on the dove-tailed guide 61 and the lower tool slide 62' is mounted to reciprocate upon the corresponding dove-tailed guide 61' of the lower ram. The upper and lower tools T and T', respectively, are mounted on the slides 61 and 61', respectively, for adjustment in the direction of movement of the slide and in a direction at right angles thereto according to known practice and in the manner described in my prior Patent No. 2,101,237 above mentioned.

The tool slides are reciprocated by a crank having a radially adjustable pin 70 (Fig. 5) that is connected by means of a link 71 and pin 72 to an arm 73 which is fastened to the shaft 74. The shaft 74 is suitably journaled in the cradle 31 and has an enlarged head 75 (Figs. 4 and 5) at its forward end. A pair of blocks 76 and 76' are pivotally mounted on pins 77 and 77', respectively, in this head. These blocks engage in elongated slots 78 and 78', respectively, formed in the slides 62 and 62', respectively, so that as the shaft 74 is oscillated by the crank, the slides 62 and 62' are moved simultaneously in opposite directions.

The crank pin 70 is carried by a block 80 which is radially adjustable in a slot formed in the front end of the shaft 82.

The shaft 82 is mounted co-axially of the cradle. It is journaled at one end in the cradle on roller bearings 83 and at its opposite end is journaled in the base 30 on roller bearings 84. Adjustment of the radial position of the crank-pin 70 may be effected by rotation of a shaft 85, which is journaled in the shaft 82, and which carries at its forward end a pinion (not shown) that meshes with a rack that is integral with or secured to the block 80. After adjustment the block is clamped in position by a headed clamping member (not shown) that is adapted to engage the block and which is manipulated by the rod 86. This rod is also mounted in the shaft 82. The means for adjustment of the block 80 and for securing it in any adjusted position form no part of the present invention and for that reason are not further illustrated.

Figure 7:
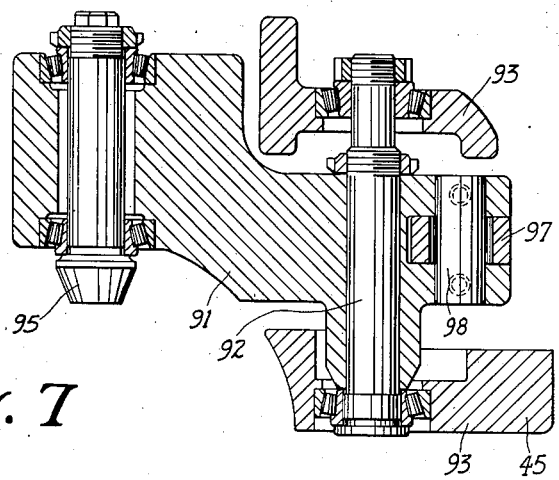
Fig. 7 is a detail sectional view on an enlarged scale showing parts of the ram-reciprocating mechanism.

Integral with the shaft 82 is a cam 90 which controls the movements of the rams 50 and 50'. This cam is operatively connected with each ram by a lever 91 (Figs. 5, 6 and 7). Each lever 91 is pivotally mounted by means of a pin 92 between upper and lower lugs or ears 93 that are formed integral with the associated tool carrier 45 or 45'. Each lever carries at one end a roller 95 that engages the face of cam 90. At its opposite end, each lever carries a roller 97 that is journaled in the lever on a stud 98. The rollers 95 engage the face of the cam 90 at diametrically opposite sides of the cam. Each roller 97 engages a hardened block 99 that is secured to the rear end of one of the rams 50 or 50'. The lengths of the lever arms 91 and the positions of the rollers 97 are so selected that the rollers 97 are substantially in line, as is clearly shown in Fig. 5, with the points of cut of the cutting tools T and T'. Thus power is applied to each ram at a point in line with the point of cut to hold the corresponding tool in cutting position.

Each block 99 carried by the ram 50 or 50' is held in engagement with the roller 97 of corresponding lever 91, and each roller 95 carried by the lever is held in engagement with the cam 90 by action of a spring-pressed plunger 94 (Fig. 6). Each plunger is housed in the carrier 45 or 45' and engages a lug 96 that is secured by a screw 109 to the corresponding ram 50 or 50'.

The cam 90 is so formed that when one of the tools T is in cutting position, the other tool T' will be withdrawn therefrom.

Figure 14:
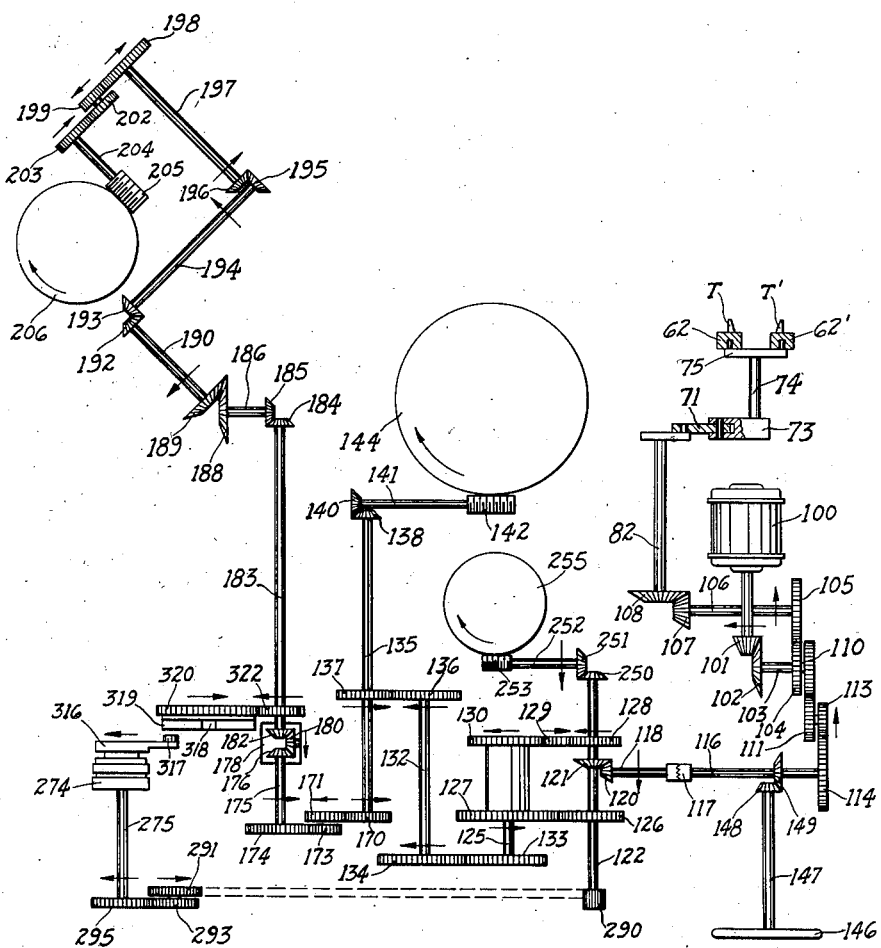
Fig. 14 is a drive diagram of the machine.

The crank shaft 82 is driven from the main motor 100 of the machine (Figs. 2 and 14) through a pair of bevel gears 101 and 102, the shaft 103, speed change gears 104 and 105 (Figs. 3, 2 and 14), shaft 106, bevel gear 107 and bevel gear 108 (Figs. 5 and 14). The latter gear is secured by screws 109 to a flange integral with the crank shaft 82.

Through the mechanism described, the rams 45 and 45' are actuated to move the cutting tools T and T' alternately to and from cutting position and the slides 62 and 62' are actuated to produce the alternate cutting and return strokes of the tools.

Figure 1:
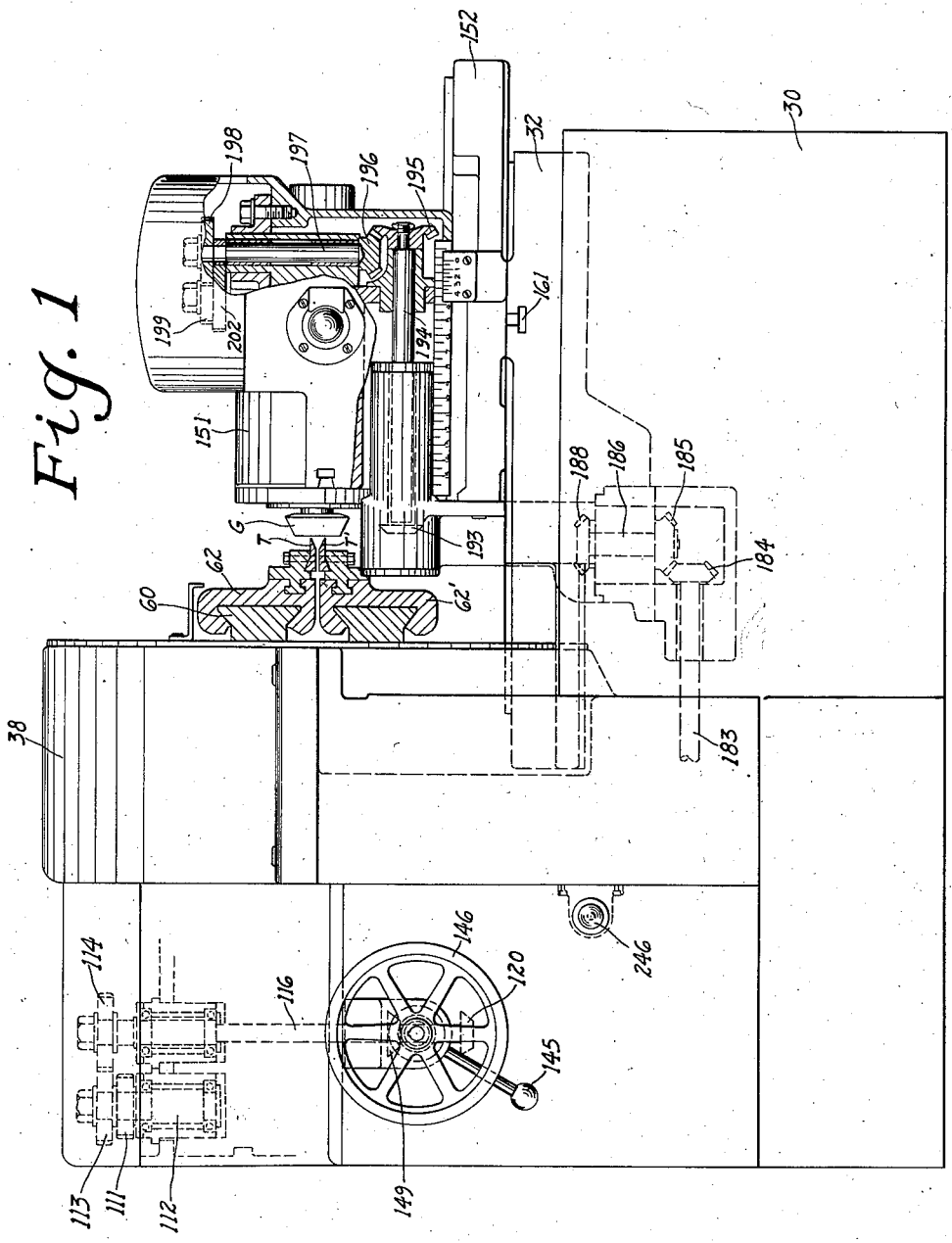
Fig. 1 is a side elevation, with parts broken away, of a machine constructed according to one embodiment of this invention, the work head being shown swung out of operating position.

The cradle is oscillated to effect the generating and return rolls through a train of gearing which will now be described. Mounted on the shaft 103 (Figs. 2, 3 and 4) is a spur gear 110 that meshes with the spur gear 111 which is secured to a stub-shaft 112 (Fig. 1). The shaft 112 is journaled in the base of the machine and has secured to its upper end a spur gear 113. This gear meshes with the spur gear 114 which is secured to a shaft 116 (Figs. 1, 3 and 14) that is journaled in the base of the machine.

The shaft 116 is connectable by means of a clutch 117, that may be of any standard or suitable construction, with an aligned shaft 118. The shaft 118 carries at its lower end a bevel pinion 120 which meshes with a bevel gear 121.

The bevel gear 121 is secured to a shaft 122 (Figs. 3 and 14), which is journaled in a bracket 123. This bracket is detachably secured in the base of the machine by bolts 124.

The shaft 122 drives a shaft 125 through a standard reversing mechanism which may be of any suitable construction, for instance, that described in my prior Patent No. 2,000,215 of May 7, 1935. Suffice it to say that the shaft 125 is driven through this reversing mechanism alternately in opposite directions. It is driven in one direction by the spur gears 126 and 127 and in the opposite direction by the spur gears 128, 129 and 130. The reversing mechanism may be controlled from the feed cam of the machine, as in my prior Patent No. 2,000,215 and as will be referred to further hereinafter.

The shaft 125 drives a shaft 132 through a pair of change gears 133 and 134 which govern the rate of roll of cradle and work spindle. The shaft 132 drives a shaft 135 through a pair of spur gears 136 and 137. The shaft 135 carries at its inner end a bevel gear 138. This bevel gear meshes with a bevel gear 140 (Figs. 4 and 14) that is keyed to a worm shaft 141. A worm 142, which is integral with this shaft, meshes with a worm wheel segment 144 that is secured in any suitable manner to the cradle 31.

The shafts 125, 132 and 135, like the shaft 122, are mounted in the bracket 123 and hence may be assembled and timed on a bench before the whole assembly is mounted in the machine.

Figure 3:
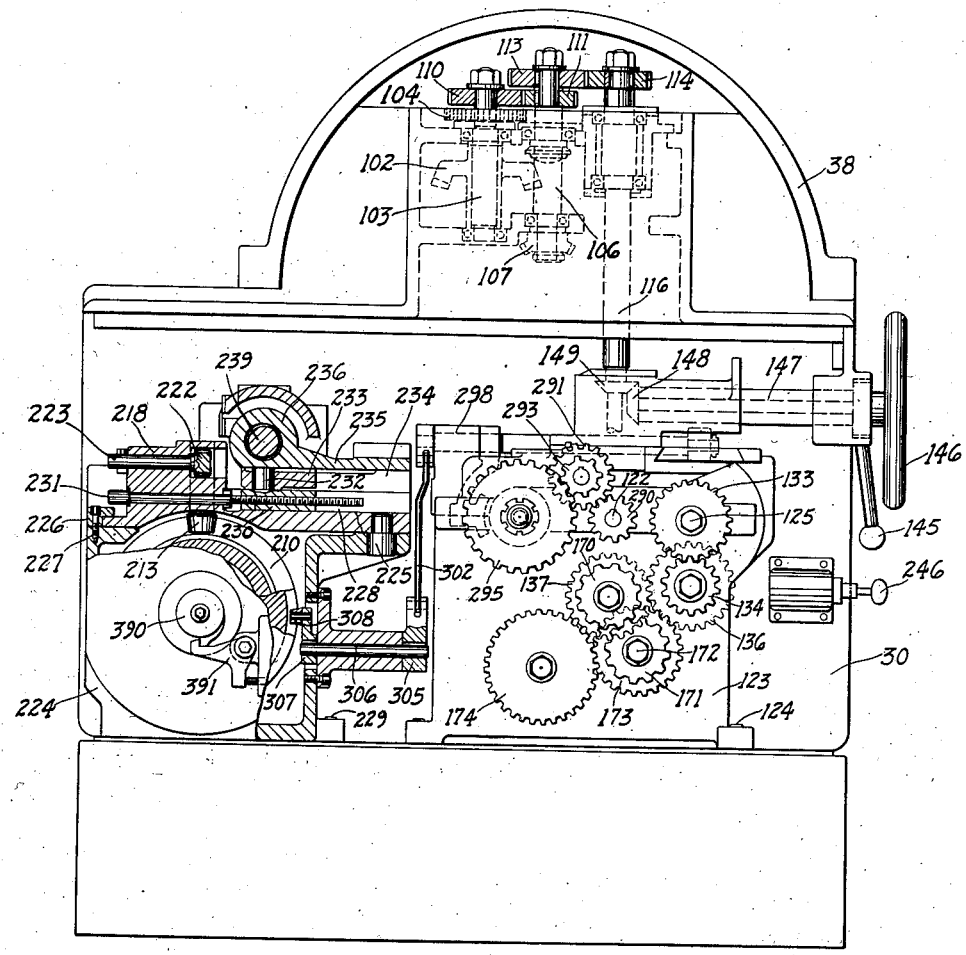
Fig. 3 is an elevational view, looking at one end of the machine, parts being broken away.

The clutch 117 (Fig. 14) allows the tool drive to be disconnected from the cradle and the other drives of the machine so as to enable the tools to be adjusted. After the clutch has been disconnected the gear-train driving the tools may be adjusted by rotating the handwheel 146 (Figs. 1, 2, 3 and 14). This handwheel is secured to a shaft 147 which carries a bevel gear 148 that meshes with a bevel gear 149 which is secured to the shaft 116. The gear 148 is moved into and out of engagement with the gear 149 by manipulation of the lever 145 (Figs. 1 and 3). This may be connected to the gear 148 in any suitable way, forming no part of the present invention.

The gear blank, which is to be cut, is secured to the work spindle 150 that is journaled in the work head 151 (Figs. 1 and 2). The work head 151 is adjustably mounted upon a plate 152 for adjustment in the direction of the axis of the work spindle. This adjustment may be effected by rotation of a shaft 153 which is journaled in the work head 151 and which carries a spur pinion 154 that meshes with a rack 155 which is secured to the plate 152. The head 151 is secured in any adjusted position on the plate 152 by means of T-bolts 157 which engage in elongated T-slots 158 that are formed in the plate 152. The work head 151 is adjusted on the plate 152 in accordance with the cone-distance of the gear to be cut.

The plate 152 is mounted on the sliding base 32 for angular adjustment thereon about an axis $x$ which extends at right angles to and intersects the axes of both cradle and work spindle. The plate is secured in any adjusted position on the sliding base 32 by T-bolts 160 which engage in arcuate T-slots 161 that are concentric with the axis $x$. The adjustment of the plate 152 on the sliding base 32 is determined by the pitch cone angle of the gear to be cut.

The sliding base 32 is adjustable and reciprocable in the direction of the axis of the cradle. It slides on parallel ways 163 formed on the upper face of the base or frame 30 of the machine.

The work spindle 150 is driven in time with the cradle rotation for the purpose of effecting the generating roll. The drive is from shaft 135. This shaft carries at its outer end a spur gear 170 (Figs. 3 and 14). This gear meshes with a spur gear 171 that is secured to a stub-shaft 172 which is journaled in the bracket 123. This shaft carries a spur gear 173 which meshes with the spur gear 174 (Figs. 3, 14, 10, and 12) that is secured to a shaft 175 which is also suitably journaled in the bracket 123. The gears 170, 171, 173 and 174 are change gears governing the ratio of roll of cradle and work spindle.

The shaft 175 carries at its inner end one member 176 of a bevel gear differential which is enclosed within a housing 178. The other members of the differential are designated at 180 and 182. The differential housing 178 is formed with sleeve-like projections 177 and 179 extending from opposite sides of the housing. The housing is journaled by means of these projections on anti-friction bearings 181 and 187 in the bracket 123. The shaft 175 is itself journaled on anti-friction bearings in the projection 177.

The bevel gear 180 is integral with the shaft 181 which is journaled on anti-friction bearings in the differential housing. The bevel gear 182 is keyed to a shaft 183 (Figs. 1, 2, 10 and 14) which is journaled in the base of the machine.

At its inner end the shaft 183 carries a bevel gear 184 that meshes with a bevel gear 185 which is secured to the lower end of a vertical shaft 186. The shaft 186 is journaled in the sliding base 32 of the machine coaxial of the axis $x$ of adjustment of the plate 152. At its upper end the shaft 186 carries a bevel gear 188. The gear 188 meshes with a bevel gear 189 that is secured to the lower end of a diagonal shaft 190 which is journaled in the plate 152. At its outer end, the diagonal shaft 190 carries a bevel gear 192. This bevel gear meshes with a bevel gear 193 which is secured to a telescoping shaft 194. The shaft 194 is journaled at one end in the plate 152 and at its opposite end in the work head 151 of the machine.

Fastened to the rear end of the shaft 194 is a bevel gear 195. This bevel gear meshes with the bevel gear 196 which is secured to the lower end of a vertical shaft 197 that is journaled in the work head 151. Keyed to the upper end of the shaft 197 is a spur gear 198. This spur gear meshes with a spur gear 199 which is secured to a stub-shaft 200. The stub-shaft 200 is journaled in the work head of the machine. It carries a spur gear 202 that meshes with the spur gear 203 which is secured to a worm shaft 204. The worm shaft 204 has integral with it a worm 205 which meshes with a worm wheel 206 that is fastened to the work spindle 150. The spur gears 198, 199, 202 and 203 are index change gears governing the number of teeth in the gear to be cut.

Through the drive described, the work spindle is rotated in time with the cradle motion to impart the generating roll to the work.

When a tooth of the gear has been cut, the work is withdrawn from engagement with the tools by movement of the sliding base 32 and when the work is clear of the tools, it is indexed. After the indexing operation has been completed, the work is fed back into engagement with the tools and a new tooth of the blank may be cut.

The alternate withdrawal and feed movements of the sliding base are controlled by the feed cam 210 (Figs. 13 and 3). This cam is provided with two tracks 211 and 212, one of which controls the movement of the sliding base during the rough-cutting of the teeth of a gear blank and the other of which is employed to control the movement of the sliding base during the finish cutting of the teeth. Two rollers 213 and 214 respectively, are provided to engage the tracks. These rollers are carried upon the lower ends of posts 215 and 216, respectively, which are mounted for axial reciprocation in the cam lever 218. Racks 219 and 220, respectively, are cut in the opposed faces of the posts 215 and 216. A spur pinion 222 meshes with the two racks. This spur pinion is integral with a shaft 223 which is journaled in the lever 218 and is manually rotatable to move one or the other roller 213 or 214 selectively into engagement with the track 211 or 212 of the cam. When one roller is moved into operative position, the other is retracted therefrom.

The lever 218 is pivotally mounted by means of the stud or pin 225 in a bracket 224 that is secured by screws 229 in the base of the machine. A gib 226 and screws 227 serve to retain the lever 218 in place.

Slidably adjustable in an elongated slot 228 formed in the lever 218 is a block 230. This block is adjusted by means of a screw shaft 231 which is journaled in the lever and which threads into the block. There is a pin 232 integral with the block 230 and on this pin there is pivotally mounted a second block 233 which engages in an elongated slot 234 formed in an extension 235 of a cylinder 236. The cylinder is slidably mounted in aligned bearings or guides 237 and 237' formed in the bracket 224. A piston 238 is mounted to reciprocate in the cylinder 236.

Integral with this piston is a piston rod 239 that is threaded at its projecting end into a nut 240 which is secured in a block 241 that is fastened to the sliding base 32.

Fluid under pressure may be admitted to the opposite ends of the cylinder 236 through ducts 244 and 245, respectively. A hand operated valve 246 of any suitable construction (Fig. 3), is provided to control the direction of flow of the pressure fluid to and from the cylinder.

The piston 238 is shown in Fig. 13 in the position which it occupies during cutting of the teeth of a gear blank. It is bottomed in the right hand end of the cylinder 236 and is held in such position by the head of pressure fluid admitted through the duct 244 and entrapped between the left hand end of the piston and the left hand end-wall of the cylinder. As the cam 210 rotates, then, the cylinder 236 will move alternately to the right and left in the bracket 224, carrying with it the piston 238 and the sliding base 32. Thus the work will be moved alternately to and from cutting engagement with the tools T and T' in a limited working path determined by the shape of that cam path 211 or 212 which at the time may be controlling the movement of the sliding base.

The track 211 controls the movements of the sliding base 32 during rough-cutting. This cam-track will be shaped to impart alternately a continuous depthwise feed movement of the gear blank into the cutting tools until a tooth has been cut to full depth and then to withdraw the work from the tools for indexing. The track 212 is provided to control the movements of the sliding base during finish-cutting. This cam-track is shaped to move the gear blank rapidly to full depth position and to cause it to dwell there during generation of a tooth and then to withdraw it for indexing.

At the end of the cutting operations upon a gear blank, when all of the teeth have been cut, the sliding base may be moved to loading position to permit removal of the completed gear and chucking of a new gear blank, by putting the duct 245 on supply and the duct 244 on exhaust. Then the piston 238 moves to the left in the cylinder 236 carrying the sliding base outwardly beyond its normal working path to loading position. When the completed gear has been removed and a new blank chucked, the sliding base can be returned to operative position by operating the valve 246 to put the duct 244 on supply again and the duct 245 on exhaust.

The cam 210 is driven from the shaft 122 through a pair of bevel gears 250 and 251 (Fig. 14). The bevel gear 251 is secured to a worm shaft 252 (Figs. 13 and 14) with which is integral a worm 253. The worm 253 meshes with a worm wheel 255 which is keyed to the shaft 256 to which the cam 210 is fastened. This shaft is suitably journaled on anti-friction bearings in the bracket 224.

The index mechanism of the machine will now be described. As already stated, during cutting the differential housing 178 is held against rotation. For indexing, the differential housing is released and is revolved to cause the bevel gear 180 (Figs. 10 and 14) to revolve on the bevel gear 182 to impart to the shaft 183 and to the work spindle an additional algebraic rotation to effect the indexing operation.

The differential housing is held against rotation during cutting by a lock-up dog 260 (Figs. 11 and 12) which is adapted to engage in a notch 261 formed in the differential housing. The lock-up dog 260 is integral with a lever 262 which is pivotally mounted upon a stub-shaft 263 that is mounted in the bracket 123. The locking dog 260 is held in engaging position by a coil spring 264 which seats against the back of the lever 262 and is carried in a lug 265 that is integral with a lever 266. The lever 266 is pivotally mounted upon the stub-shaft 263 along side the lever 262.

The lever 262 has a tail portion bent in one direction and carrying a roller 270. The lever 266 has a tail portion which is bent in the opposite direction from the tail portion of the lever 262 and which carries a roller 272. The rollers 270 and 272 are adapted to engage with different peripheral portions of a rotary and reciprocable control member 274.

This control member is slidably keyed to a shaft 275 which is suitably journaled in the bracket 123. It is formed with four separate peripheral control surfaces that are successively disposed axially of the control member, one adjoining another. These are, in order, a peripheral cam surface 276, a truly cylindrical control surface 277, a peripheral cam surface 278 and a truly cylindrical control surface 279.

The cam surface 276 has a dwell portion 280 (Fig. 11) and a dwell portion 281 suitably connected by rises 282 and 283. The dwell portion 280 extends around nearly half of the periphery of the cam and lies at a given radial distance from the axis of the shaft 275. The dwell portion 281 extends around nearly the other half of the periphery of the cam and lies at a lesser radial distance from the axis of the shaft 275.

The cylindrical surface 277 of the control member 274 has a radius equal to the radius of the dwell portion 281 of the cam 276.

The cam member 278 is constructed like the cam member 276, but the major and minor diametral portions of the two cams are slightly spaced angularly relative to one another in accordance with the angular spacing of the rollers 270 and 272, so that the portion of the cam 278, which is of major radius, is in alignment with part of the portion 281 of the cam 276, which is of minor radius, and vice versa.

The cylindrical portion 279 of the control member has a radius equal to major radius of the cams 276 and 278.

When the locking dog is in operative position, the control member 274 is in the position shown in Fig. 12 and the roller 270 rides on the cylindrical surface 277 of the control member, which is of minor radius. At the same time, the roller 272 of the lever 266 rides on the cylindrical surface 279 which is of major radius. Thus the levers 262 and 266 are held in the positions shown in Fig. 11 and the spring 264 is operative to hold the locking dog 260 in engagement with the notch 261 in the differential housing 178.

When the control member 274 is shifted axially on the shaft 275, however, the cam 276 is moved into engagement with the roller 270 and the cam 278 is moved into engagement with the roller 272. The shifting of the control member occurs, as will be described hereinafter, when the minor radius portion 281 of the cam 276 is in registry with the point of contact between the roller 270 and the cylindrical surface 277 and when the major radius portion of the cam 278 is correspondingly in registry with the point of contact between the roller 272 and the cylindrical surface 279. Thus the shifting of the control member may occur without clash.

As the control member 274 continues to rotate, after it has been shifted as described, the roller 270 will ride up on to the portion 280 of the cam 276, which is of major radius, and the roller 272 will ride down on to the portion of the cam 278 which is of minor radius. The movement of the roller 270 up on to the portion 280 of the cam 276 will cause the lever 262 to be moved counter-clockwise about the axis of the stub shaft 263, and the movement of the roller 272 down on to the portion of the cam 278, which is of minor radius, will cause a similar movement of the lever 266. Thus, the lock dog 260 will be withdrawn from operating position, releasing the differential housing 178.

The shaft 275 is driven continuously during the operation of the machine from the shaft 122 (Figs. 3 and 14) through a spur pinion 290 which is secured to this shaft and which meshes with a spur gear 291 (Figs. 3, 10, 11 and 14) that is journaled on a stub-shaft 292. The stub shaft 292 is journaled in the bracket 123 and carries a spur pinion 293 which meshes with a spur gear 295 that is keyed to the shaft 275.

The shifting of the control member 274 axially on the shaft 275 is effected by movement of a pivoted yoke member 297 (Figs. 11 and 12) which is keyed to shaft 298 that is journaled in the bracket 123. The yoke member 297 is provided with a shoe 299 that engages in a groove 300 formed on the control member 274 between the cam 276 and a flange 301.

The shaft 298 is rocked by a lever 302 (Figs. 3 and 11) which is connected at one end to a collar 304 that is keyed to shaft 298. At its opposite end, this lever 302 is pivotally connected to an arm 305 which is keyed to one end of a shaft 306. This shaft is suitably journaled in an extension of the bracket 224 and has keyed to its opposite end an arm 307. This arm carries a roller 308. The roller 308 engages in a cam track 310 formed in the feed cam 210 (Fig. 13). Thus, the control member 274 is shifted in time with the feed and withdrawal operations of the machine.

The track 311 of the cam 210 controls the reversing mechanism of the machine through a mechanism similar to that described in my Patent No. 2,000,215 above mentioned.

When the differential housing 178 is released as above described, it is rotated to impart through the differential gears the indexing motion to the train of gears which drive the work spindle. The rotary movement of the differential housing is effected through a Geneva mechanism which will now be described.

Secured to the control member 274 as by means of screws 315 is a crank plate 316 (Figs. 10, 11, 12 and 14). This crank plate carries two angularly spaced rollers 317.

Figure 10:
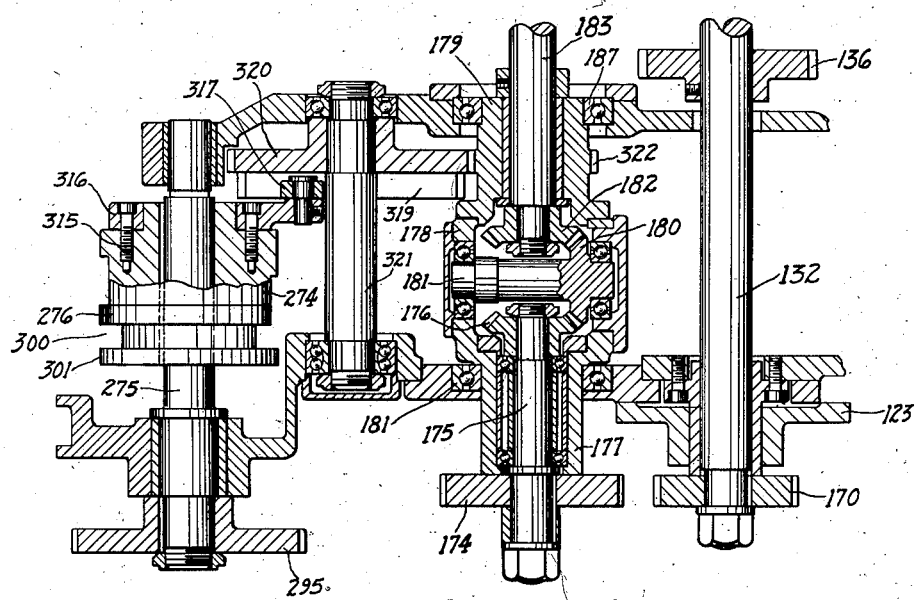
Fig. 10 is a developed sectional view of the indexing mechanism of the machine.

When the control member 274 is shifted to the right from the position shown in Fig. 12 to that shown in Fig. 10, the rollers 317 are moved into a position where, as the control member rotates, they will successively enter successive slots 318 of a Geneva wheel 319.

The Geneva wheel 319 has four slots extending at right angles to one another and forming a cross-shaped recess. The Geneva wheel is secured to a spur gear 320. This spur gear is secured to a shaft 321 that is suitably journaled in the bracket 123. It meshes with a spur pinion 322 which is integral with the sleeve portion 179 of the differential housing 178. Thus, as the Geneva wheel 319 is rotated by one or other of the rollers 317, motion is imparted to the differential housing to effect an added algebraic motion of the train of gearing, which drives the work spindle, to thereby index the work spindle.

To enable any one of a group of roughed gear blanks to be quickly adjusted on the machine so that the teeth of a blank will lie in the proper relation to the cutting tools so that the cutting tools will remove the desired amounts of stock from each of the teeth and produce a finished gear having accurately spaced teeth, the improved stock dividing mechanism of the present invention is provided. This will now be described.

Figure 15:
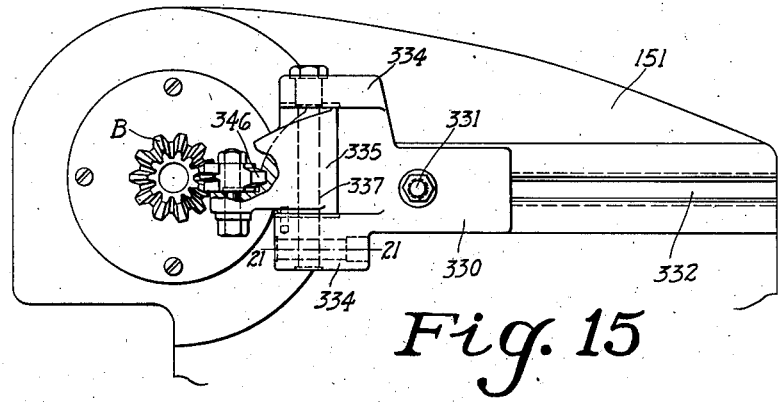
Fig. 15 is a view looking at the front end of the work head of the machine and showing particularly a stock dividing device, constructed according to one embodiment of the present invention, in use, locating a roughened bevel gear blank for cutting.
Figure 16:
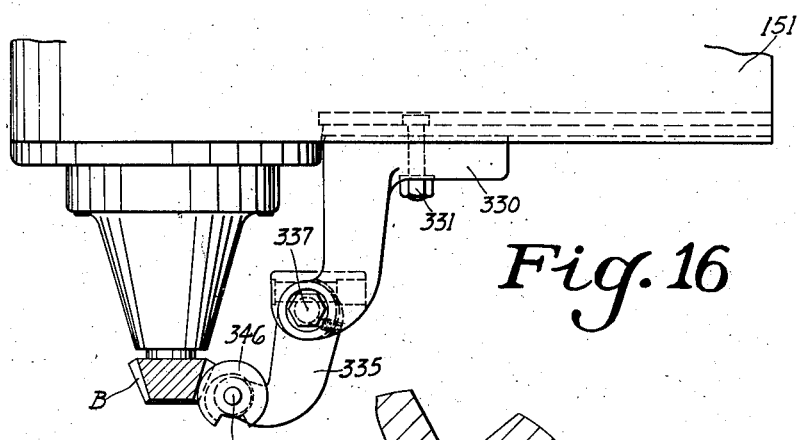
Fig. 16 is a plan view of the parts shown in Fig. 15.

As already stated, this improved stock dividing mechanism may take one of several different embodiments. In each case, however, the stock dividing gauge proper is carried by a bracket 330 (Figs. 2, 15 and 16) which is mounted for lateral adjustment upon the front face of the work head 151. The bracket 330 has a tongue adapted to engage in the elongated T-slot 332 formed in the front face of the work head and is secured in any adjusted position by the T-bolt 331 whose head engages in this slot. In the illustrated embodiment of the invention, the median line of the slot 332 extends radially of the axis of the work spindle of the machine and lies in the horizontal plane containing the axes of cradle and work spindle.

The bracket 330 is formed with ears 334. Pivotally mounted upon the bracket 330 by means of a pin or shaft 337 is an arm 335. This arm is keyed to the shaft 337 and carries at its outer end a stud 336 on which is rotatably mounted the stock dividing gauge itself.

Figure 21:
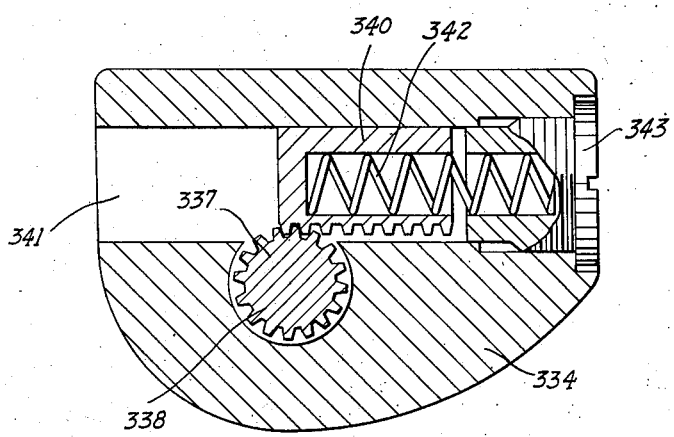
Fig. 21 is a section on the line 21—21 of Fig. 15 but on a much enlarged scale.

When a roughed gear blank B has been chucked on the machine, the arm 335 is swung about its pivot to bring the stock dividing gauge into engagement with the blank. When the stock dividing operation has been completed, the arm 335 is swung out of the way so as not to interfere with the cutting operations of the machine. In the illustrated embodiment of the invention, the arm is constantly urged into inoperative position by spring pressure. The shaft 337, which forms a pivot for the arm 335, has spur gear teeth 338 cut around its periphery as shown in Fig. 21. A rack member 340 meshes with these teeth 338. This rack member is adapted to slide in a hole 341 bored in the lower ear 334 of the bracket 330. A coil spring 342, which is interposed between the rack member and a nipple 343, tends to move the rack member constantly to the left to swing the arm 335 out of operative position. The nipple 343 is threaded into one end of the hole 341 closing the same.

In Figs. 15 to 18 inclusive, I have shown a stock-dividing gauge such as may be employed for positioning a roughed gear blank having an odd number of teeth. This gauge is in the form of a rotary body 345 that has tooth-like projection 346 formed to extend nearly full way around its periphery. The gauge is so made that the median line of this tooth-like projection lies in the same plane as the median line of the tongue which is formed on the bracket 330 and which engages in the T-slot 332. Thus, the median line of the tooth-like projection 346 will lie in the horizontal plane of the machine. Hence when the gauge is engaged in a tooth space 353 of a gear blank, the tooth 354 of the gear which is diametrically opposite that tooth space will, as is diagrammatically illustrated in Fig. 17, be correctly positioned for engagement by the cutting tools T and T'. The median line of this tooth will lie in the horizontal plane of the machine. As each tooth of the gear blank is successively indexed into position, to be cut, then, it will be in the correct position for cutting and a finished gear having teeth spaced properly thereon will be produced.

The opposite sides 347 and 348 of the tooth-like projections 346 are helical surfaces of straight profile but of opposite hand so that they diverge from one another from one end 349 of the projection to the opposite end 350 thereon. Thus, the thickness of the projection 346 increases around the periphery of the body 345. Hence, by rotatably adjusting the gauge 345 on its pivot stud 336, different parts of the tooth-like projection 346 may be brought into operative position to gauge a roughed gear.

Figures 17, 18:
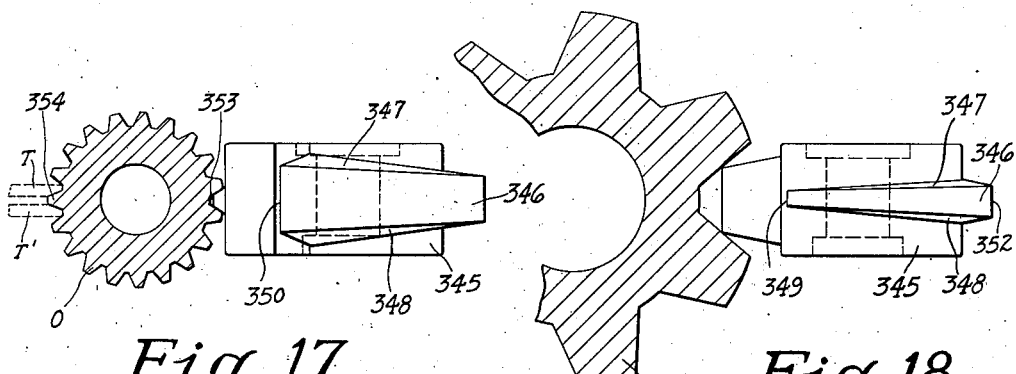
Fig. 17 is a diagrammatic view illustrating the use of the stock dividing gauge for locating a gear of a given pitch having an odd number of teeth.
Fig. 18 is a diagrammatic view illustrating the use of the same gauge in locating a gear of much larger pitch but having also an odd number of teeth.

Any gear, regardless of its pitch, which has an odd number of teeth and which comes within the cutting range of the machine may be located by the gauge 345. Thus, as diagrammatically illustrated in Fig. 17, the gauge 345 may be employed for positioning a gear blank O of fine pitch, having a small number of teeth, by rotatably adjusting the gauge 345 to bring a portion of the tooth-like projection 346 of proper thickness into operative position and then swinging the arm 335 to engage this portion of the gauge in a tooth space of the gear blank. In Fig. 18 the gauge is shown in use for locating a gear O' having an odd number of teeth but of considerably coarser pitch than the gear O. The gauge has been rotatably adjusted to bring a portion of the tooth-like projection 346 of appropriate thickness into position to engage in a tooth space of the gear.

In the embodiment of the invention shown in Figs. 17 and 18, the top surface 352 of the tooth-like projection 346 is concentric with the axis of the body 345, but the body itself is turned down eccentric of this axis so that the height of the tooth-like projection will vary around the periphery of the body increasing from the small end 349 to the large end 350. This is for convenience in having the tooth-like projection engage to a suitable depth in a tooth space of the gear blank which is to be positioned on the machine.

The peripheral distance between the beginning 349 of the tooth-like projection and the end 350 of the same is slightly greater than the face-width of any gear that may be cut on the machine so that either extremity of the tooth-like projection may be employed to gauge a gear without danger that the other extremity will interfere.

Figures 19, 20:
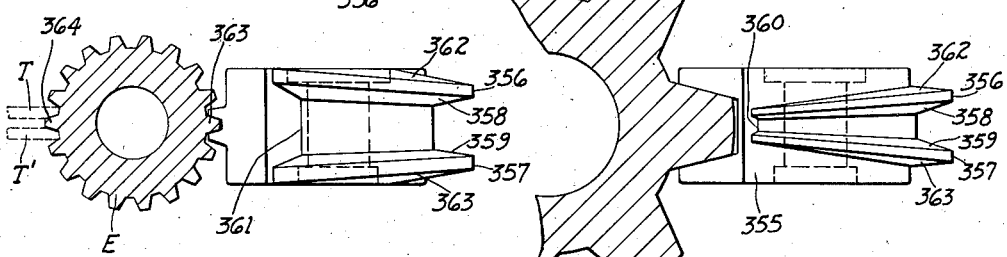
Fig. 19 is a diagrammatic view illustrating the use of a modified form of stock dividing device in the positioning of a gear of fine pitch having an even number of teeth.
Fig. 20 is a corresponding view, showing the same stock dividing device used for positioning a gear of much coarser pitch but having also an even number of teeth.

Figs. 19 and 20 show a modified form of gauge for positioning gears having even numbers of teeth. This gauge comprises a rotary body 355 having two tooth like projections 356 and 357 formed thereon that bound a tooth space which is adapted to straddle a tooth of the gear blank to be gauged. The median line of this space by construction lies in the horizontal center line of the machine so that when the gauge is engaged with a tooth 363 of a roughed gear blank E, as shown in Fig. 19, the tooth 364 of the blank diametrically opposite the first tooth will be correctly positioned for cutting by the tools T and T'.

The adjacent side surfaces 358 and 359 of these tooth-like projections are helical surfaces of straight profile but of opposite hand so that they diverge from one another from one end 360 of the gauge member to the other end 361 thereof. Thus the space between the two tooth-like projections is of increasing width from the end 360 to the end 361 of the gauge. To allow for the stock which has to be removed from the roughed gear blank in the finish-cutting operation, the width of the space at the starting end 360 is slightly greater than the thickness of a tooth of the finest pitch gear which may be cut on the machine and the width of the space at the large end 361 is made slightly greater than the thickness of a tooth of the coarsest pitch gear that may be cut on the machine. Thus, the gauge will handle any rough gear which is to be finish-cut.

The sides 362 and 363 of the tooth-like projection 356 and 357 respectively may be made of any suitable shape. They may be conveniently turned to the same leads as the active sides 358 and 359, respectively.

Fig. 19 shows the gauge adjusted to locate a gear blank E, having an even number of teeth but of fine pitch, with reference to the cutting tools T and T', and Fig. 20 shows the gauge rotatably adjusted so that a wider portion of the space between the tooth-like projections 356 and 357 is in operative position to engage a gear blank E' of a considerably coarser pitch. The tops of the tooth-like projections 356 and 357 is turned concentric of the gauge member, but the land between these tooth-like projections is turned eccentric of the axis of this member. The tooth-like projections themselves, then, increase in height around the periphery of the gauge for convenient use in gauging gear blanks of different pitches.

In Figs. 22 to 26, inclusive, I have illustrated a still further modification of the invention in the form of a universal type gauge. This gauge may be employed for positioning any gear, which is within the cutting range of the machine, whether it has an odd or an even number of teeth and regardless of its pitch.

This gauge has a body portion 375 on which is formed a projection which begins at one end as a single tooth-like projection 376 and is then bifurcated to form two tooth-like projections 377 and 378. The opposite sides 379 and 380 of the projection 376, which subsequently form the outside surfaces of the projections 377 and 378, are helical surfaces of straight profile and uniform lead but of opposite hand. The outside surfaces 379 and 380 bound a tooth-like member which may be employed in locating gears, such as the gear O" shown in Fig. 23, which have an odd number of teeth. By rotating the gauge around on its axis, different portions of the projections 377 and 378 can be engaged in a tooth space of a rough gear blank, in accordance with the pitch of the gear blank to locate the gear blank properly relative to the cutting tools.

At a suitable convenient point around the periphery of the gauge, the tooth-like projection 376, as already stated, is bifucated. The inside surfaces 381 and 382 of the furcations are helical surfaces of straight profile of uniform lead but of opposite hand. The furcations form a space of increasing width for straddling a tooth of a roughed gear blank to position a gear which has an even number of teeth in proper relation to the cutting tools.

The width of the space between the furcations at their small end is, as in the case of the gauge shown in Figs. 19 and 20, equal to the width of a tooth of a finished gear of the finest pitch, which it is practicable to cut on the machine, plus the necessary allowance for stock to be removed from the opposite sides of the teeth of the roughed gear blank in order to produce the finished gear. Likewise, the width of the tooth-like projection 376 at its smallest end is, as in the case of the gauge shown in Figs. 17 and 18, equal to the width of a tooth space of a gear of the finest pitch, which can be cut on the machine, less an allowance for the amount of stock to be removed from the opposite sides of the tooth spaces of the gear blank in the finish-cutting operation.

Since the width of the space between the furcations 377 and 378 is determined by the pitch of a gear plus the allowance for stock to be removed in the finishing operation and since the width of the tooth-like projection formed by the sides 379 and 380 is equal to the width of a tooth space of the gear less the allowance for stock to be removed in the finish cutting operation, it will be obvious that the leads of the sides 381 and 382 of the tooth-like projections 377 and 378 will be different, respectively, from the lead of the sides 379 and 380 of those projections. The toothlike projections extend around the periphery of the gauge 375 for a distance sufficient to provide an intervening space of sufficient width to allow the gauging of a gear having an odd number of teeth and of the greatest pitch that can be cut upon the machine. Since the point, at which a space of sufficient width is provided to gauge a gear having an odd number of teeth, is angularly removed from the point of beginning of the tooth-like projection 376, it will be obvious that the outside surfaces 379 and 380 extend for a distance greater than is required to gauge a gear of the largest pitch that can be cut upon the machine.

The operation of the present machine will be understood from the preceding description but may briefly be summed up here. We shall assume that the sliding base 32 is in fully withdrawn or loading position. The plate 152 is adjusted angularly on the sliding base 32 in accordance with the pitch cone angle of the gear to be cut and the work head 151 is adjusted on the plate 152 in accordance with the cone distance of the gear to be cut. The tool carriers 45 and 45' are adjusted angularly in the cradle in accordance with the angle of convergence of the sides of the teeth of the gear to be cut. The gear blank to be cut is placed upon the work spindle and the stock dividing gauge is swung over to locate the blank properly on the machine. The gauge will position the roughed gear blank so that the tooth or tooth space opposite that engaged by the gauge, depending upon whether the gear has an even or an odd number of teeth, will be correctly positioned between the cutting tools with its median line lying in the horizontal plane of the machine. The gear blank is then chucked Any suitable chucking mechanism may be employed for this purpose. Then the operator moves the sliding base into operative position by actuating the valve 246 (Fig. 3) to put the left hand end of the cylinder 236 (Fig. 13) on supply.

The machine may then be started. Then the tool slides 62 and 62' are reciprocated back and forth to actuate the cutting tools T and T', being driven from the crank shaft 82 through the pin 70, link 71, arm 73, actuating plate 75 and blocks 76 (Figs. 5 and 14). The slides 62 and 62' move simultaneously in opposite directions. During the cutting stroke of one tool, the other tool is in withdrawn position on its return stroke. The tools are moved to and from cutting position at opposite ends of their strokes by the cam 90 which operates the rams 50 and 50' through levers 91.

During rough-cutting of a gear, the cradle 31 and work spindle 150 are ordinarily held stationary and the reciprocating tools T and T' are simply fed into depth by the feed cam 210 (Figs. 13 and 14) until a tooth space has been cut to full depth. Then the work is moved away from the tools and is indexed. The feed cam 210 produces the feed and withdrawal movements through its track 211, the roller 213, lever 218, blocks 230 and 233 (Figs. 3 and 13), cylinder 236, the head of motive fluid entrapped between the cylinder and the piston 238, the piston 238, piston rod 239, nut 240 and block 241. This block is secured to the sliding base 32.

During finish cutting, the roller 214 is engaged with the track 212 of the cam and the work is fed rapidly into full depth position and remains there during the generating roll. When a tooth of the gear has been completely generated, the sliding base is withdrawn and the blank is indexed.

The rolling motion is imparted to the blank during finish-cutting by rotation of the work spindle through the gearing already described and by simultaneous rotation of the cradle. When the cradle has rolled sufficiently in one direction to generate the tooth profiles, the roll of the cradle is reversed through the reversing mechanism of the machine and the cradle is returned to initial position.

In either rough-cutting or finish-cutting when a tooth has been cut and the sliding base has been withdrawn sufficiently for the blank to clear the tools, the work is indexed. The indexing mechanism is tripped from the track 310 of the feed cam 210 (Fig. 13). This operates through the roller 308 (Fig. 3), arm 307, shaft 306, link 302, shaft 298 and yoke-member 297 (Fig. 11) to shift the control member 274 from the position shown in Fig. 12 to that shown in Fig. 10. When the control member is thus shifted, the cam surfaces 276 and 278 (Figs. 11 and 12) are brought into engagement with the rollers 270 and 272, respectively, to rock the levers 262 and 266 to unlock the differential housing 176. While the locking dog 260 is moving out of the notch 261 of the differential housing, one of the rollers 317 of the crank plate 316 will enter one of the slots 318 of the Geneva wheel 319 and, as soon as the locking dog 260 has moved fully out of the notch 261, the roller will start to drive the Geneva wheel. This will cause the differential housing 176 to be rotated through the gearing 320, 322. This causes the work spindle to be rotated, if the gear is being rough cut, and it causes an additional algebraic motion to be imparted to the work spindle, if the blank is being finish-cut and the work-spindle is already being rotated through the generating drive of the machine. Thus the work is indexed. At the end of the indexing operation the differential housing is locked up again and the control member 274 is moved back to the position shown in Fig. 12. Then the work is fed back into engagement with the tools through operation of the feed cam, feed lever 218, cylinder 236, piston 238 and piston rod 239. Then a new tooth of the gear is cut.

After all of the teeth of the blank have been cut, the machine may be stopped automatically by a standard automatic stop, tripped for instance, from a cam 390 (Figs. 3 and 13) secured to the cam shaft 256. This cam may operate the automatic stop in known fashion through a bell-crank lever 391. The sliding base may then be withdrawn from its working path to loading position by putting the right hand end of the cylinder 236 on supply and the left hand end on exhaust. The completed gear may then be removed from the machine and a new blank chucked.

Figure 8:
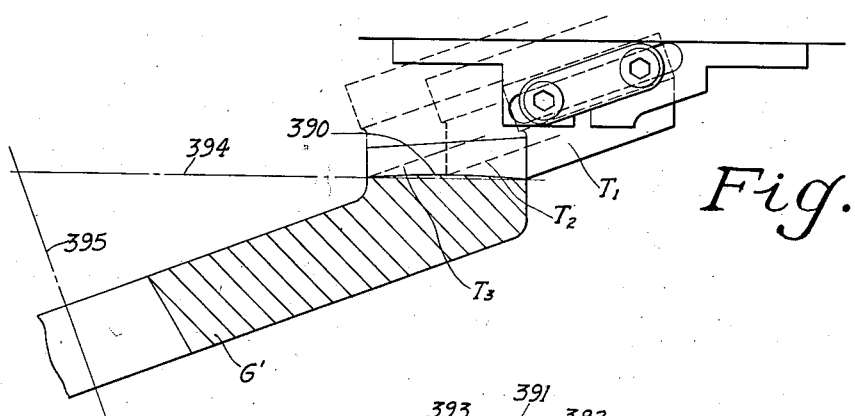
Fig. 8 is a diagrammatic view illustrating the movement of a tool across the face of a gear blank in the cutting of a bevel gear with crowned teeth according to the process of the present invention.
Figure 9:
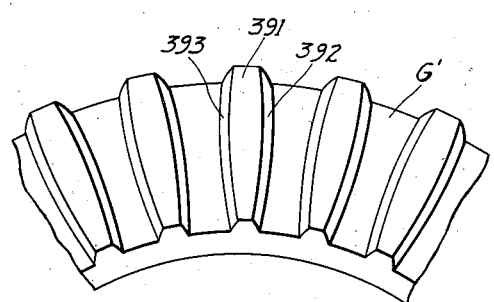
Fig. 9 is a fragmentary plan view of a bevel gear so cut.

With the present machine, as already stated, it is possible to cut straight tooth bevel gears having crowned teeth. Such an operation may be effected by using a ram-control cam (Figs. 5 and 14) of suitable shape. Such a cam will be shaped to slightly decrease the depth of cut of each cutting tool as it moves from one end to the center of a tooth and then to slightly increase the depth of cut again as the tool moves from the center to the other end of the tooth. Each tool will thus be moved in a depth-wisely curved path across the face of the tooth as clearly illustrated in Fig. 8. T₁, T₂, and T₃ denote, respectively, three different positions of a cutting tool during the cutting of a tooth of a gear blank G'. It will be seen that the tool cuts a tooth space in the blank having a convex bottom 390. Since each tool has a positive pressure angle and cuts at a less depth at the center of the tooth space than at the ends of the tooth space, teeth will be produced upon the gear having side surfaces 392 and 393 which are crowned as clearly shown in Fig. 9. Such a gear will mesh with its mate with a localized tooth bearing. In Fig. 8, 394 denotes the normal root cone surface of the gear and 395 the axis of the gear.

While the present invention has been described particularly in connection with a machine for producing straight bevel gears, it will be understood that certain features of the invention are capable of use on other types of gear cutting machines also. This application is intended to cover any variations, uses or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing gears, a work support, a tool support, a pair of rams reciprocable on the tool support for movement toward and away from the work, a slide reciprocable on each ram in a direction at right angles to the direction of reciprocation of the ram, a tool secured to each slide, means for reciprocating the slides to move them simultaneously in opposite directions to effect alternate cutting and return movements of the tools across the face of a gear blank, a single rotary cam, a pair of levers, each of which is pivotally mounted between its ends in the tool support, means operatively connecting one end of each lever to one of the rams to move the ram on movement of the lever, followers carried by the opposite ends of the two levers and engaging said cam at diametrically opposite points, the track of said cam being formed with a portion which operates to vary the depth to which each tool projects into a tooth space of the blank as the tool moves across the face of the blank on each cutting stroke, with a portion which operates to hold each tool in withdrawn position during each return stroke of the tool and with portions connecting the first two named portions and which operate to move each tool into and out of cutting position, respectively, at opposite ends, respectively, of the stroke of the slide carrying the tool and means for rotating the cam in time with the means for reciprocating the slides so that the cam makes one revolution during a reciprocation of the two slides.

2. In a machine for producing gears, a work support, a reciprocatory tool, means for reciprocating the tool to effect cutting and return strokes of the tool longitudinally of a tooth space of a gear blank, means for varying the depth of cut of the tool as it moves from one end of the tooth space to the other on its cutting strokes, means for effecting a relative depthwise feed movement between the tool and blank to feed the tool into proper depth, means for periodically withdrawing the tool out of engagement with the blank, and means for indexing the blank when the tool is withdrawn.

3. In a machine for producing gears, a work support, a reciprocatory tool, means for reciprocating the tool longitudinally of a tooth space of a gear blank to effect cutting and return strokes of the tool, means for causing the tip of the tool to move in a longitudinally convex path as the tool moves from one end of the tooth space to the other on each cutting stroke so that the tool will cut side tooth surfaces on the blank which are longitudinally crowned, means for effecting a relative depthwise feed movement between the tool and blank to cut the tooth spaces to the proper depth, means for periodically withdrawing the tool from engagement with the blank, and means for indexing the blank when the tool is withdrawn.

4. The method of producing a gear which comprises cutting the side surfaces of its teeth by moving a tool, which has a side-cutting edge of positive pressure angle in a straight path across the face of a gear blank from one end of a tooth space of a blank to the other while varying the depth to which the tool extends into the tooth space as it moves from one end of the tooth space to the other, and periodically indexing the blank.

5. The method of producing a gear which comprises moving a tool, which has a side cutting edge of positive pressure angle, in a longitudinally straight path across the face of a gear blank from one end of a tooth space of the blank to the other, and varying the depthwise position of the tool during said longitudinal movement so that the tip of the tool travels in a convex circular arc as the tool moves from one end of the tooth to the other.

6. In a machine for producing gears, a work support, a tool support, a ram reciprocable on the tool support for movement toward and from the work, a tool slide reciprocably mounted on the ram for movement in a direction at right angles to the direction of reciprocation of the ram, a tool secured to the tool slide, a crank shaft, means operatively connecting the crank shaft to the tool slide to reciprocate the tool slide on rotation of the crank shaft, a cam secured to the crank shaft to rotate therewith, a pivotally mounted lever, means operatively connecting the lever at one end to the cam, and means operatively connecting the lever at its opposite end to the ram.

7. In a machine for producing gears, a frame, a work support adjustably mounted on the frame, a work spindle journaled in the work support, a cradle oscillatably mounted on the frame, means for rotating the work support and the cradle in timed relation to effect generation of the tooth profiles, a ram mounted in the cradle for reciprocation in a direction parallel to the axis of the cradle, a slide mounted on the ram for reciprocation in a direction at right angles to the direction of reciprocation of the ram, a tool secured to the slide, a crank shaft journaled in the frame and cradle coaxially of the cradle, means operatively connecting the crank shaft to the slide to reciprocate the slide on rotation of the crank shaft, a cam secured on the crank shaft to rotate therewith, a lever pivotally mounted on the cradle, means for transmitting the motion of the cam to the ram comprising a roller, which is carried on one end of the lever and which engages the cam, and a roller, which is carried at the opposite end of the lever and which engages the ram.

8. In a machine for producing gears, a frame, a cradle oscillatably mounted in the frame, a sliding base reciprocable on the frame in the direction of the axis of the cradle, a work support mounted on the sliding base, a tool support mounted on the cradle, a ram mounted on the tool support for reciprocation in the direction of the axis of the cradle, a slide reciprocable on the ram in a direction at right angles to the direction of reciprocation of the ram, a tool mounted on the slide, a crank shaft journaled in the frame and the cradle coaxially of the cradle, means operatively connecting the crank shaft to the slide to reciprocate the slide on rotation of the crank shaft, a cam secured to the crank shaft to rotate therewith, a lever pivotally mounted in the tool support, means operatively connecting the lever at one end with the cam and at its opposite end to the ram, means for rotating the work support and cradle in timed relation to effect generation of the tooth profiles, means for rotating the crank shaft, means for moving the sliding base alternately in opposite directions to effect alternate feed and withdrawal movements of the work, and means for indexing the work when it is withdrawn from engagement with the tool.

9. In a machine for generating gears, a frame, a cradle oscillatably mounted on the frame, a sliding base reciprocably mounted on the cradle for reciprocation in the direction of the axis of the cradle, a tool support mounted on the cradle, a work support mounted on the sliding base, a work spindle journaled in the work support, a control unit mounted in the frame at one end thereof comprising a drive shaft, a reversible shaft operatively connected with the drive shaft and operatively connectable with the cradle to drive the cradle, a differential operatively connectable with the reversible shaft and with the work spindle to rotate the work spindle, means for locking one element of the differential against movement during cutting, and means for rotating said element when released to effect indexing of the work spindle, a second control unit mounted on the frame at the same end thereof as the first unit and comprising means for controlling the locking means, means for governing the direction of rotation of the reversible shaft, and means controlling the movement of the sliding base, both of said control units being detachably connected to the frame whereby the elements of said units may be synchronized apart from the machine.

10. In a machine for generating gears, a frame, a cradle oscillatably mounted on the frame, a sliding base reciprocably mounted on the frame for reciprocation in the direction of the axis of the cradle, a tool support mounted on the cradle, tool mechanism mounted on the tool support, a work support mounted on the sliding base, a work spindle journaled in the work support, an electric motor, gearing operatively connecting the motor with the tool mechanism to actuate the same and including a set of change gears governing the speed of the tool movement, a shaft journaled on the frame and extending in the direction of the axis of the cradle, gearing operatively connecting said shaft with the motor, a second shaft journaled on the frame and extending parallel to the first shaft, gearing operatively connecting the second shaft with the first shaft and including a set of change gears to control the rate of generating roll of the cradle and work spindle, a third shaft journaled in the frame parallel to the axis of the cradle, gearing for driving the third shaft from the second shaft and including a set of change gears for controlling the ratio of rotation of the work spindle and cradle, gearing including a differential for connecting the third shaft with the work spindle, a rotary cam controlling the movement of the sliding base, adjustable means connecting said cam with the sliding base, means for driving said cam from the first shaft, means for holding one element of the differential against movement during cutting, a second cam operatively connected with the first cam for controlling the locking and unlocking of the differential, gearing including a set of change gears for rotating said element of the differential when released, all of said change gears being located at the same end of the machine, and means, which is also located at the same end of the machine, for adjusting the means which connect the first cam with the sliding base, whereby all of said parts may be readily accessible to the operator from one end of the machine.

11. In a machine for producing gears, a tool support, a work support, a slide on which one of said supports is mounted, and means for reciprocating said slide to effect alternate relative feed and withdrawal movements between the work and the tool comprising a rotary cam, a lever operatively connected to the cam, a cylinder reciprocably mounted in the frame of the machine and operatively connected to said lever, a piston reciprocable in said cylinder, means operatively connecting the piston to the slide, and means for admitting fluid under pressure selectively to opposite ends of the piston.

12. In a machine for producing gears, a tool support, a tool mechanism mounted on the tool support, a work support, a slide on which one of said supports is mounted, and means for reciprocating said slide to effect alternate feed of the work into the tool and withdrawal of the work from the tool for indexing, said means including a rotary cam, a cylinder operatively connected to the cam to reciprocate on rotation of the cam, a piston reciprocable in the cylinder, means for admitting fluid pressure to one end of the piston to hold the piston bottomed in one end of the cylinder during cutting, means for admitting fluid pressure to the opposite end of the cylinder to move the slide relative to the cam to loading position, and a valve controlling the direction of flow of the pressure fluid to the piston.

13. In a machine for producing gears, a work support, a tool support, tool mechanism mounted on the tool support, a reciprocable base on which one of said supports is mounted, means for reciprocating the base to effect alternate relative feed and withdrawal movements between the work and the tool mechanism comprising a piston connected to the base, a cylinder in which the piston is reciprocable, means for applying hydraulic pressure to hold the piston in relatively fixed position in the cylinder during cutting, means for moving the cylinder alternately in opposite directions in a limited working path to effect feed and withdrawal movements of the base, and means for applying hydraulic pressure to move the piston in the cylinder to move the base to loading position.

14. In a machine for producing gears, a work support, a tool support, a cradle on which one of said supports is mounted, a work spindle journaled in the work support, tool mechanism mounted on the tool support, means for oscillating the cradle, means for moving the work spindle in timed relation with the cradle movement to effect generation of the tooth profiles including a differential, means for locking one element of the differential against rotation during cutting, means for periodically releasing said locking means, and means for rotating said element of the differential, when released, to effect indexing of the work spindle, said last named means including a Geneva wheel, means for rotating said Geneva wheel, and gearing operatively connecting the Geneva wheel with the described element of the differential.

15. In a machine for producing gears, a work support, a tool support, a cradle on which one of said supports is mounted, a work spindle journaled in the work support, tool mechanism mounted on the tool support, means for oscillating the cradle, means for rotating the work spindle in time with the cradle movement to effect generation of the tooth profiles including a differential, a locking dog adapted to hold one element of the differential against rotation during cutting, a Geneva wheel operatively connected to said element of the differential, and means for periodically disconnecting the locking dog and rotating said Geneva wheel including a rotary control member having a cam surface for controlling the position of the locking dog, and a pin for engaging the Geneva wheel, and means for rotating said control member.

16. In a machine for producing gears, a work support, a tool support, a cradle on which one of said supports is mounted, a work spindle journaled in the work support, means for oscillating the cradle, means for rotating the work spindle in time with the cradle movement to generate the tooth profiles including a differential, a locking dog adapted to hold one element of the differential against rotation during cutting, a Geneva wheel operatively coonnected to said element, a rotatable cam, a pin operatively connected to the cam to rotate therewith and adapted to be engaged with the Geneva wheel to rotate the same as the cam rotates, means for rotating the cam, and means for periodically moving the cam axially to cause it to engage the locking dog and to cause the pin simultaneously to move into operative relation with the Geneva wheel whereby on continued rotation of the cam, the locking dog is disengaged and the Geneva wheel is rotated to effect indexing of the work spindle.

17. In a machine for generating gears, a work support, a tool support, a cradle on which one of said supports is mounted, a work spindle journaled in the work support, means for oscillating the cradle, means for rotating the work spindle in time with the cradle movement to generate the tooth profiles comprising a differential, a locking dog for holding one element of the differential against rotation during cutting, a Geneva wheel operatively connected to said element, and means for periodically indexing the work spindle comprising a rotatable cam, a pin carried by the cam, means for rotating the cam in time with the rotation of the cradle and the work spindle, means also operable in time with the last named means for reciprocating the cam axially to move the cam and pin, respectively, alternately into and out of operative relation with the locking dog, and the Geneva wheel, respectively, so that when the cam is in operative position, the locking dog will be disengaged by the cam in its rotation and the Geneva wheel will be rotated by the pin to effect the indexing operation.

LEONARD O. CARLSEN.